United States Patent [19]
Thompson

[11] Patent Number: 4,678,067
[45] Date of Patent: Jul. 7, 1987

[54] INTERNAL SHOE-DRUM BRAKE
[75] Inventor: Richard E. Thompson, Gwent, United Kingdom
[73] Assignee: Lucas Industries Public Limited Company, Birmingham, England
[21] Appl. No.: 759,904
[22] Filed: Jul. 29, 1985
[30] Foreign Application Priority Data
Aug. 9, 1984 [GB] United Kingdom ............... 8420228
[51] Int. Cl.⁴ ..................... F16D 51/48; F16D 65/14
[52] U.S. Cl. .................................. 188/328; 188/342; 188/106 F
[58] Field of Search ............... 188/78, 325, 328, 331, 188/342, 106 F, 79.5 GE, 79.5 SC, 196 BA, 79.5 GT, 79.5 K, 329, 332, 106 A; 192/111 A

[56] References Cited
U.S. PATENT DOCUMENTS
3,589,476  6/1971  Evans ........................... 188/196 BA
3,708,044  1/1973  Torri et al. ................. 188/106 F X
4,387,792  6/1983  Imamura ..................... 188/106 F X FOREIGN PATENT DOCUMENTS
2149166  4/1972  Fed. Rep. of Germany ...... 188/331
1341549  12/1973  United Kingdom .
1448553  9/1976  United Kingdom ................ 188/325

Primary Examiner—Andres Kashnikow
Assistant Examiner—Robert J. Oberleitner
Attorney, Agent, or Firm—Holman & Stern

[57] ABSTRACT

An internal shoe-drum brake includes a first actuator disposed between one pair of adjacent brake shoe ends, a strut extending between the shoes adjacent the actuator, an abutment device disposed between the other pair of adjacent shoe ends, and a mechanical second actuator. Lever arms are pivotally engaged with the strut at spaced locations and are operatively associated with the second actuator. Rollers carried by the lever arms engage the brake shoes at intermediate locations lengthwise thereof so that actuating forces from the second actuator are applied to the shoes at said intermediate locations to initiate duo-servo operation of the brake.

19 Claims, 6 Drawing Figures

INTERNAL SHOE-DRUM BRAKE

BACKGROUND OF THE INVENTION

1. Field of the Invention

This invention relates to an internal shoe-drum brake, primarily for a motor vehicle, of the general type including a pair of arcuate brake shoes which may be separated into braking engagement with a surrounding brake drum alternatively by a first actuator, normally hydraulically operated, for normal service braking, or by a second, normally mechanical, actuator for parking purposes.

2. Description of the Prior Art

One configuration of drum brake of the aforesaid general type is widely used for the rear brakes of passenger cars and incorporates a hydraulic service actuator and a mechanical parking brake actuator which are arranged to operate in the leading/trailing manner for both the hydraulic service and the mechanical parking actuation modes, being generally satisfactory for such vehicles in both modes of operation. However, for somewhat heavier duty applications, such as on light commercial vehicles for example, it is desirable to have a high factor parking brake, preferably of the duo-servo kind, in order to fulfil the heavier duty braking requirements for such vehicles.

One prior proposal of this latter kind is illustrated in U.S. Pat. No. 3,708,044, which illustrates a drum brake in which a hydraulic actuator and an automatic strut adjuster are both positioned in the aforesaid upper region and the mechanical actuator is positioned in the lower region of the brake. The mechanical actuating force is applied directly to one shoe and via a generally horizontal link to a first bell-crank lever pivoted to one end of the other shoe, the force being transferred by a link from the first lever to another bell crank lever pivoted at the other end of said other shoe so that the actuating force is applied more or less simultaneously to both ends of the shoe. Not only is this arrangement excessively complex, but the fixed points of force application to the shoes will not necessarily lead to an optimum duo-servo effect. Moreover, since the levers and links are mounted wholly at one side of the shoe, the input forces from the mechanical actuator are offset from the plane of the shoe web, leading to lack of balance and possible unsatisfactory operation in the duo-servo mode. Also, since the levers are pivoted on the shoes, these and the link will require at least some measure of dismantling during servicing of the brake, which is inconvenient and time consuming.

BRIEF SUMMARY OF THE INVENTION

An object of the present invention is to provide an internal shoe-drum brake in which leading/trailing service braking and duo-servo parking braking are provided in a simple and convenient manner while avoiding, at least to a large extent, the problems referred to above.

According to the present invention, an internal shoe-drum brake comprises a pair of arcuate brake shoes mounted on a backplate, a first actuator disposed between one pair of adjacent shoe end portions and operable to expand the shoes into braking engagement with a brake drum for service operation, a strut extending between the shoes at a location adjacent said one pair of adjacent shoe end portions, an abutment device disposed between and normally engaged by the other pair of adjacent shoe end portions, and a mechanical second actuator disposed adjacent to one pair of shoe ends, a lever arm engaged adjacent one of its ends with one end of the strut and operatively associated with the second actuator, and force transmission means carried by said arm and positioned to engage the adjacent brake shoe at an intermediate location along the shoe length, the arrangement being such that operation of the second actuator causes the lever arm to pivot on the strut and, in doing so, apply an actuating force via said thrust means to the shoe at said intermediate location such as to initiate duo-servo operation of the brake via said strut which takes place upon contact of the shoe with the drum under said actuating force.

Usually, in practice, a pair of lever arms is provided, one for each shoe, the arms being pivotally engaged with the strut at longitudinally spaced locations thereon.

In one convenient arrangement, suitable for cross-pull operation of the second actuator, an operating lever adapted for connection to operating means such as a cable has a pair of links pivotably connected at spaced locations thereto, the links being coupled respectively to said lever arms, whereby pivoting of the operating lever in one direction causes separating movement of the links and lever arms.

Alternatively, for forward pull operation of the second actuator, one of the links is pivoted on one shoe and forms the operating lever, being engaged with the other link so that pivoting of the operating lever in one direction causes separating movement of the links and lever arms.

In one preferred embodiment of the invention using a single lever arm, the arm is pivotally connected adjacent one of its ends to the strut and at its other end to an actuating lever, the lever arm and actuating lever being connected respectively to parts of an operating device such that actuation of the latter causes relative pivoting of said arm and lever in opposed directions, an abutment being provided adjacent the actuating lever such that engagement therewith by this lever causes the lever arm to pivot outwardly about its pivotal connection with the strut.

BRIEF DESCRIPTION OF THE DRAWINGS

The invention will now be described, by way of example, with reference to the accompanying drawings wherein.

DETAILED DESCRIPTION

Figure 1:
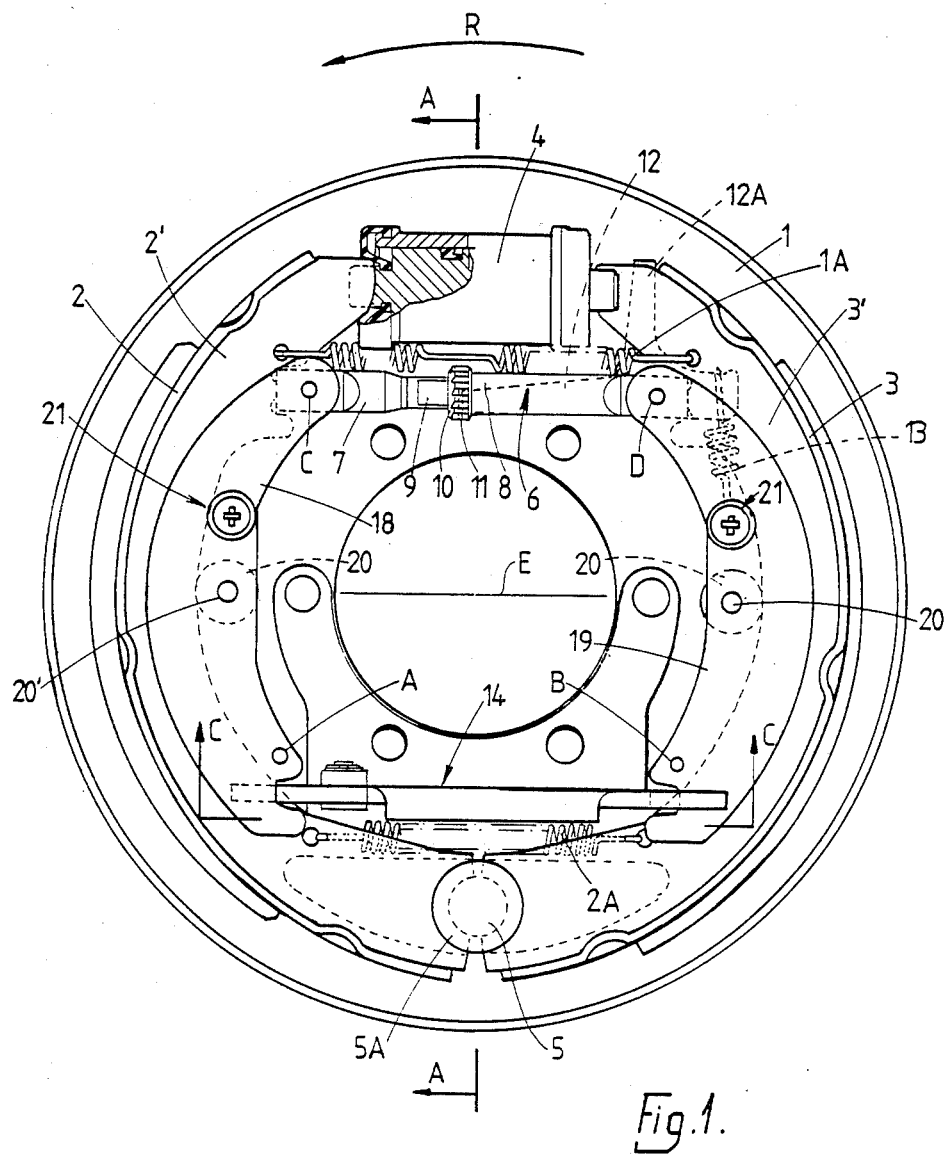
FIG. 1 is a front elevational view of one form of the internal shoe-drum brake of the invention.
Figure 2:
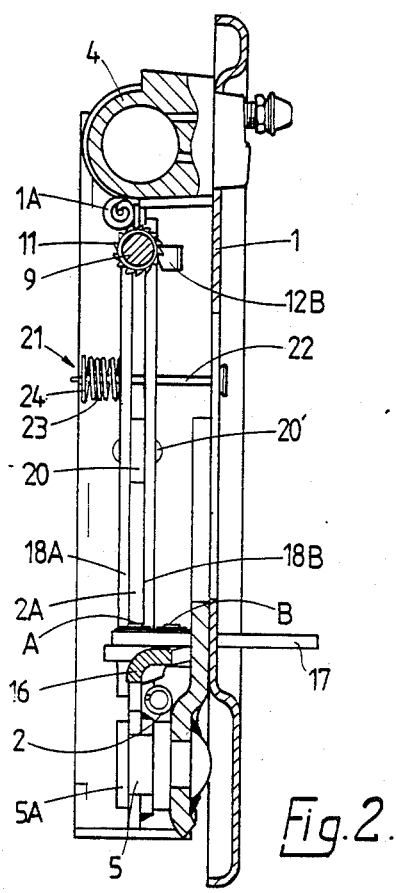
FIG. 2 is a cross-sectional view taken along the line A—A of FIG. 1.
Figure 3:
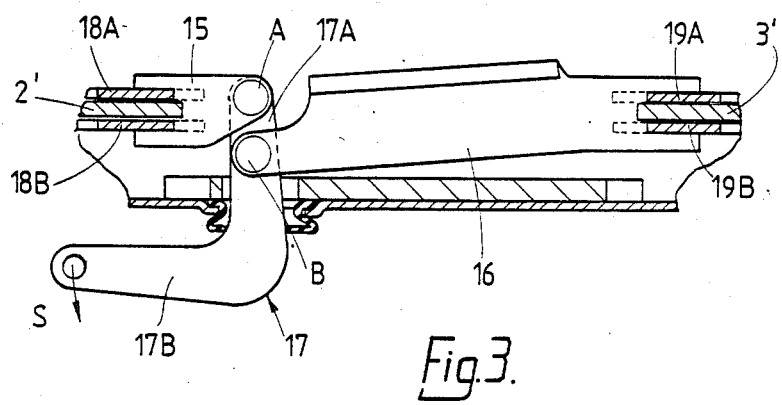
FIG. 3 is a cross-sectional view taken along the line C—C of FIG. 1.

Referring to FIGS. 1 to 3, the internal shoe-drum brake shown therein comprises a backplate 1 having a pair of brake shoes 2, 3 mounted thereon, the shoes being separable, against the action of return springs 1A, 2A into engagement with a surrounding brake drum (not shown) by a double-acting hydraulic wheel cylinder 4 disposed between one pair of adjacent shoe ends and rigidly fixed to the backplate 1. The other pair of adjacent shoe ends normally engage an abutment pin 5 rigidly secured to the backplate, the pin having a radial flange 5A to assist in locating the shoes.

The brake includes an automatic strut adjuster, indicated generally at 6, of variable length which is mounted with its ends respectively in abutment with the webs of the shoes 2, 3. The strut is composed of a pair of telescopically interengaged parts 7, 8, the part 7 having an externally threaded portion 9 carrying a correspondingly threaded nut 10 which abuts against an end of the hollow strut part 8 and has ratchet teeth 11 formed around its outer surface. A pawl 12 is pivoted on the strut part 8 and is urged to rotate in a clockwise direction by a pawl spring 13. The pawl 12 has an upstanding tongue 12A which engages against the shoe 3 to react the force of the spring 13 and to sense movement of the shoe 3 for adjustment purposes. An extremity 12B of the pawl engages one of the ratchet teeth 11 on the nut 10 (FIG. 2). The adjuster used in this embodiment is of the kind disclosed in more detail in our British Pat. No. 1341549, to which reference is directed for a full description of the construction and operation thereof.

A hand brake actuation mechanism, indicated generally at 14, is arranged adjacent the abutment pin 5 and includes a pair of oppositely extending links 15, 16 (FIG. 3), the links being pivoted at respective locations A, B on one arm 17A of a bell-crank hand brake lever 17 arranged in a "cross-pull" configuration, the other arm 17B of the lever being normally connected to a cable or other element (not shown) for actuation by a parking brake lever in the vehicle. The free ends of the links 15, 16 are in abutment with respective ones of a pair of lever arms 18, 19, (FIG. 1) each pivotally connected by pins or the like C, D to a respective one of the strut parts 7, 8, the pivot location D also serving as the pivot for the pawl 12. Each lever arm 18, 19 is composed of a pair of spaced parallel plates 18A, 18B and 19A, 19B, the respective pairs of plates being rigidly held in assembled relationship by pins or the like A, B, C, D, the pins C, D having been already referred to as connecting the lever arms to the strut. Each lever arm carries a thrust roller 20 rotatably mounted between its respective pair of parallel plates on a further pin 20' which also acts to form an additional rigid connection between the pair of plates. Each roller is mounted at a location on or near to the horizontal diameter E of the brake (FIG. 1) and bears against the radially inner edge of the adjacent shoe web 2′, 3′. Shoe hold-down devices 21 of conventional type co-operate with the lever arms 18, 19, at locations radially inwardly of the shoe webs 2′, 3′, rods 22 of the hold-down devices passing through the backplate 1 and through holes in the lever arms, each to co-operate with a spring 23 and retaining washer 24, in the usual manner. Since the spaced plates of the lever arms embrace parts of the adjacent shoe webs, the hold-down devices arranged in this manner are effective in retaining the shoes in a direction perpendicular to the backplate. It will be noted that the spring 13 is also hooked into a slot (not shown) in one or both of the plates 19A, 19B, of the lever arm 19 and is not connected directly to the shoe web. The advantages of these arrangements will be made apparent hereinafter.

For service brake operation, the pistons of the wheel cylinder are expanded hydraulically, to separate the shoes into engagement with the surrounding drum, the shoes pivoting about the fixed abutment pin 5. In normal service operation, therefore, the brake assumes a leading/trailing configuration, the shoe 2 leading and the shoe 3 trailing when the drum is rotating in the direction indicated by arrow R, which would normally be the forward direction of rotation when related to a vehicle. As will be well understood, the adjuster pawl will be rotated in a clockwise direction by the spring 13 to the extent permitted by outward movement of the shoe 3 against which the pawl tongue 12A abuts and will either simply slide back and forth, during brake application and release, along the tooth 11 of the nut with which it is presently engaged or, in the event that the shoe to drum clearance has become such as to necessitate adjustment of the brake, will move to the next tooth as the brakes are applied and rotate the nut under the action of the shoe return springs to extend the strut when the brake is released. The extended strut will then retain the shoes in a new position of adjustment closer to the drum.

Parking operation of the brake is normally effected by first applying the service brake to separate the shoes in the manner described above. A force is then applied to the lever 17 in the direction indicated by the arrow S, which causes the links 15 and 16 to move outwardly in opposite directions so as to in turn pivot the lever arms 18 and 19 outwardly about the pivot points C, D. The thrust rollers 20 bearing against the shoe webs apply an expanding force to the brake shoes 2, 3, moving the shoes into engagement with the drum surface and thereby moving the lowermost pair of adjacent shoe ends away from the fixed abutment pin 5. Any rotation of the drum which now takes place in the direction opposite to that of arrow R, for example, will tend to cause the shoe 2 to move around the drum in a clockwise direction and, since the strut 6 is effectively floating, such movement of the shoe 2 will be transmitted via the strut to the shoe 3, moving the latter around the drum into abutment with the pin 5, thereby enabling a full duo-servo braking effect to be obtained. The rollers 20 will enable a degree of self centering to take place during the aforesaid shoe rotation, helping to maintain the shoe applying forces at their optimum location.

Figure 4:
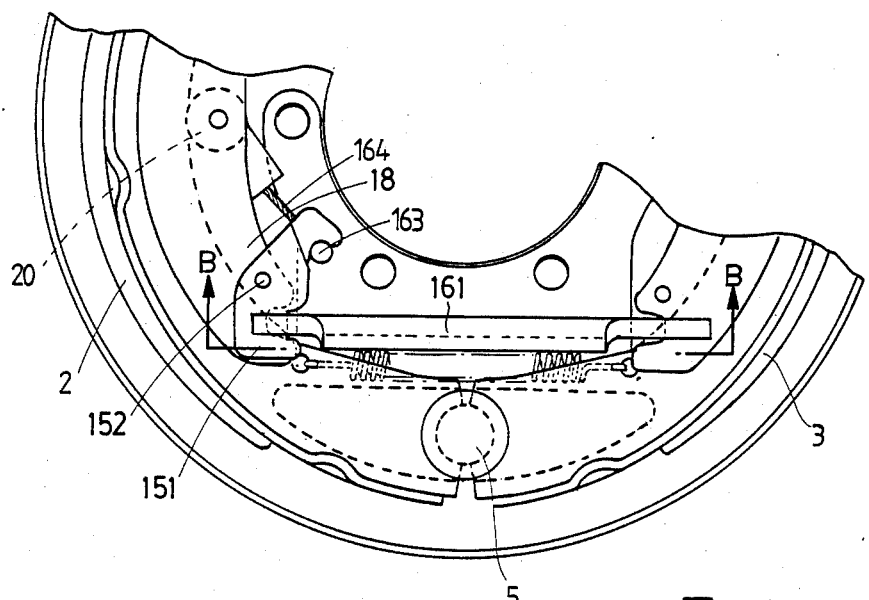
FIG. 4 is a fragmentary elevational view, similar to FIG. 1, illustrating an alternative form of the brake of the invention.
Figure 5:
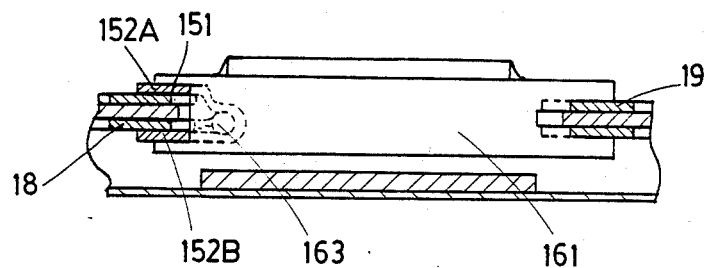
FIG. 5 is a cross-sectional view taken along the line B—B of FIG. 4.

The alternative embodiment illustrated in FIGS. 4 and 5 is generally similar to the preceding one, the differences being largely to permit operation of the mechanical actuator in a "forward pull" manner. This is achieved by modifying the original arrangement of links 15 and 16 and now providing a link 151 in the form of a bell crank lever and mounting it on the lever arm 18 by way of a pin 152 which performs the function of the pin A of the previous embodiment. As can be seen from FIG. 5, the link 151 is generally U-shaped and arranged with the arms 152A and 152B thereof embracing the lever arm 18, the base of the U being deformed to provide a formation to receive the enlarged end 163 of a Boden operating cable 164. The other link 161 is similar to link 16 previously described, being in pivotal engagement at one end with the link 151 and at its other end with the lever arm 19. It will be seen that, when the link 151 is pivoted in a counterclockwise direction, the shoes 2 and 3 will be moved away from the fixed pin 5, as before, into contact with the drum, following which a duo-servo braking action takes place as previously described.

The brake of the invention may alternatively incorporate only one lever arm 18, 19 which would usually be provided on the normally trailing shoe. One embodiment of such an arrangement is identical with that of FIGS. 1 to 3 with the exception that the lever arm 18 is omitted and the web 2′ of the shoe 2 abuts the adjacent link 15 directly. Operation of the brake is the same as for FIGS. 1 to 3, the shoe 3 with the associated lever arm being the trailing shoe for drum rotation in the direction of the arrow R in FIG. 1 and becoming the leading shoe for the reverse direction.

Figure 6:
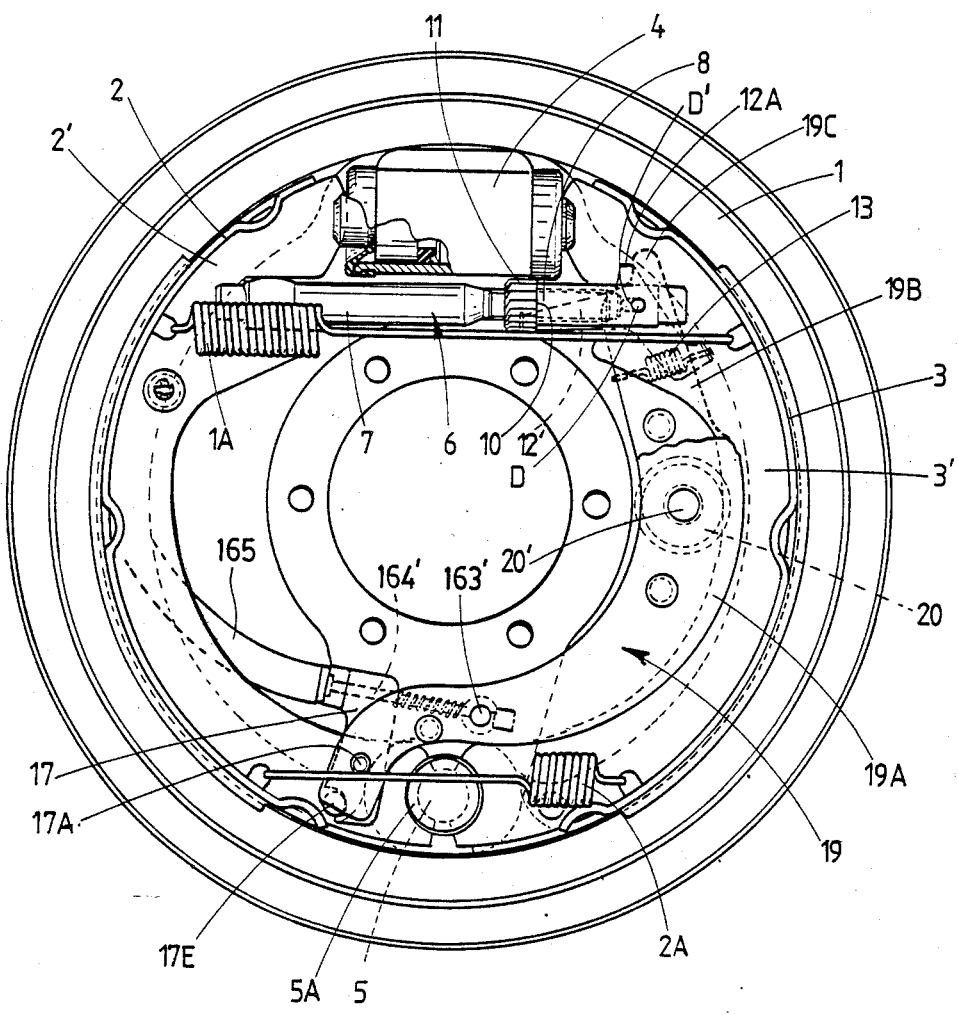
FIG. 6 is a front elevational view, similar to FIG. 1, of an alternative embodiment of the brake of the invention.

A further alternative embodiment of the invention incorporating only one lever arm is illustrated in FIG. 6. The general arrangement of the brake is similar to that of FIGS. 1 to 5 and references from the latter will be used, where applicable. In the present embodiment the single lever arm 19, which comprises a pair of spaced parallel plates 19A, 19B lying at either side of the shoe web 3′ is pivoted at one end on the strut part 8 by way of a pin D which projects from either side of the strut, the forked end of the strut being disposed between the plates 19A, 19B and embracing the shoe web. The upper end portion of the arm 19 as seen in the drawing is shown with part of the arm 19A broken away to permit the underlying arm 19B to be clearly seen. A pawl 12′ is also pivotally mounted on the pin D and lies underneath plate 19B. A spring 13 acts between the pawl and lever arm, urging the pawl to rotate in a clockwise direction, and the pawl has a projecting tongue 12A which engages against a projection 19C of the arm 19B to react the force of the spring and sense movement of the shoe 3 for adjustment purposes, as will be described hereinafter. The pawl extends into engagement with ratchet teeth 11 on the nut 10, as in the previous embodiment.

The end of the lever arm 19 adjacent the abutment pin 5 is pivotally connected to an actuating lever 17′ by means of a pin 17A′ and an actuating cable, shown as a Bowden cable, has its inner cable 164′ connected to the arm 19 at 163′ and its outer sheath 165 engaging the lever 17′. The lever 17′ engages an abutment, shown as a pin 17E, rigid with the shoe web 2′. The Bowden cable is connected, in use, to a driver-operated hand brake lever in conventional manner.

Service brake actuation is effected by the hydraulic cylinder 4 in the manner described for the previous embodiment. The bias provided by the spring 13 is sufficient to cause the lever arm 19 to move outwardly with the shoe 3 and the pawl 12 pivots under the action of the same spring to follow outward movement of the lever arm and thereby of the shoe 3. A slot D′ in the lever arm permits relative movement between the strut and lever arm in a direction longitudinally of the strut and the strut is biassed away from the lever arm by the forces generated at the pivot pin D by the action of the spring 13. When outward movement of the shoe 3 does not exceed the maximum permitted shoe-to-drum clearance, the pawl slides along the ratchet tooth with which it is presently in engagement and no adjustment occurs. When shoe movement exceeds the aforesaid clearance, the pawl engages an adjacent tooth and rotates the nut to a new position of adjustment upon brake retraction in the manner described previously.

Parking brake actuation is initiated by operation of the Bowden cable, causing the lever 17′ to rotate in a clockwise direction about the pin 17A′ causing the shoe 2 to be pushed outwardly towards the drum.

This produces a reaction via the pin 17A′ on the lever arm 19 which pivots about the pin D on the strut and, via roller 20, urges the shoe 3 outwardly away from the pin 5 into contact with the drum. Contact with the drum causes the shoes to rotate in the direction of drum rotation until one of the shoes, dependent upon the direction of drum rotation, engages the adjuster strut, the other shoe then engaging the abutment pin 5, at which time drag forces on the leading shoe are applied via the strut, which is effectively floating together with the hydraulic cylinder pistons, to the trailing shoe and duo-servo braking is thereby obtained. This action occurs for both directions of drum rotation.

Application of the parking brake with the service brake actuated will not provide a duo-servo action, since the brake will already be in a leading/trailing mode of operation with the shoes pivoting on the pin 5. Release of the service brake will, however, permit rotation of the shoes in the manner described above and duo-servo action will ensue once more. Since the edge surface of the web 3′ which is engaged by the roller 20 is concentric with the drum, no extra hand brake input force will be necessary as the service brake is released.

The brake of the invention provides a number of advantages over conventional brakes of this type. It will be seen, for example, that when lever arms are provided for both shoes, there are no positive connections between the shoes and any of the other components, even the hold-down devices 21 acting via the lever arms 18 and 19 and not passing through the shoe webs in the usual manner. This enables the brake shoes to be removed from the brake by simply disconnecting the shoe return springs 1A, 2A and moving the shoes radially outwardly to clear the other components. Servicing of the brake of the invention is thus greatly simplified as compared with some conventional arrangements. When only one lever arm is provided, the web of the shoe without the lever arm may accommodate the shoe hold-down device in the conventional manner.

Moreover, since the pairs of spaced plates 18A, 18B and 19A, 19B, constituting the lever arms lie in a symmetrical manner at either side of the respective shoe webs and the input loads from the hand brake mechanism are applied via the rollers 21 directly to the shoe webs, such loads are applied in balanced manner and are not offset in relation to the shoes. The problems due to offset loadings found in some conventional arrangements are thereby avoided. Similarly, the arrangement of the lever arm connections C, D with the strut 6 on the longitudinal central axis of the strut enables the loads from the lever arms arising during duo-servo braking to be transmitted along the said strut axis, again leading to balanced operation. The use of the roller thrust devices 20 permits the shoes a degree of self-centering in the duo-servo condition, thereby ensuring that load is applied from the hand brake mechanism to the shoes at the optimum position.

I claim:

1. An internal shoe drum brake comprising:
   a pair of arcuate brake shoes mounted on a backplate;
   a first actuator disposed between one pair of adjacent shoe end portions and operable to expand the shoes into braking engagement with a brake drum for service operation;
   a strut having one end and extending between the shoes at a location adjacent said one pair of adjacent shoe end portions;

an abutment device disposed between and normally engaged by the other pair of adjacent shoe end portions;

a mechanical second actuator disposed adjacent to said abutment device;

a lever arm having one end adjacent one of said brake shoes and engaged adjacent said one end of said lever arm with said one end of said strut, and an opposite end adjacent said abutment device, said lever arm being operatively associated with said mechanical second actuator; and force transmission means supported on said lever arm in a position to engage said one brake shoe at an intermediate location between said one end of said lever arm and the end of said one brake shoe adjacent said abutment device;

so that operation of said mechanical second actuator causes said lever arm to pivot about the engagement thereof with said strut and more outwardly with respect to the brake axis and thereby apply an actuating force to said one brake shoe by said force transmission means at said intermediate location for initiating duo-servo operation of the brake via said strut upon contact of said one brake shoe with the drum.

2. A brake as claimed in claim 1 and further comprising:

a second lever arm adjacent the other brake shoe;

said lever arms being pivotally connected to said strut at longitudinally spaced locations thereon.

3. A brake as claimed in claim 2 wherein said strut is adjustable in length and further comprising:

a ratchet device on said strut; and a pawl pivotally mounted on said strut adjacent said one brake shoe and co-operatively engaging waid ratchet device and a surface movable with said one brake shoe to sense the required degree of adjustment of said strut for automatically adjusting the length of said strut.

4. A brake as claimed in claim 3 wherein:

said pawl and lever arm are adjacent to each other and are both pivotally mounted on said strut about a common pivot axis.

5. A brake as claimed in claim 4 wherein said mechanical second actuator comprises:

a pivotally mounted operating lever;

a pair of links each pivotally connected at spaced locations to said operating lever and coupled respectively to said lever arms; and operating means to pivotally operate said operating lever, so that pivoting of said operating lever in one direction causes said links to move said lever arms apart with respect to each other.

6. A brake as claimed in claim 4 wherein said mechanical second actuator comprises:

an operating first link pivotally mounted on one of said brake shoes; and a second link coupled at spaced locations thereon to said lever arms, so that pivotal movement of said first link in one direction causes said lever arms to move apart with respect to each other.

7. A brake as claimed in claim 2 wherein said mechanical second actuator comprises:

a pivotally mounted operating lever;

a pair of links each pivotally connected at spaced locations to said operating lever and coupled respectively to said lever arms; and operating means to pivotally operate said operating lever, so that pivoting of said operating lever in one direction causes said links to move said lever arms apart with respect to each other.

8. A brake as claimed in claim 7 wherein:

said force transmission means comprises a roller.

9. A brake as claimed in claim 2 wherein said mechanical second actuator comprises:

an operating first link pivotally mounted on one of said brake shoes; and a second link coupled at spaced locations thereon to said lever arms, so that pivotal movement of said first link in one direction causes said lever arms to move apart with respect to each other.

10. A brake as claimed in claim 1 wherein said strut is adjustable in length and further comprising:

a ratchet device on said strut; and a pawl pivotally mounted on said strut adjacent said one brake shoe and co-operatively engaging said ratchet device and a surface movable with said one brake shoe to sense the required degree of adjustment of said strut for automatically adjusting the length of said strut.

11. A brake as claimed in claim 10 wherein:

said pawl and lever arm are adjacent to each other and are both pivotally mounted on said strut about a common pivot axis.

12. A brake as claimed in claim 10 wherein:

said force transmission means comprises a roller.

13. A brake as claimed in claim 1 wherein:

said lever arm is pivotally connected adjacent said one end thereof to said strut and has a second end; and said mechanical second actuator comprises, an actuating lever pivotally connected to said lever arm adjacent said second end thereof, an abutment on the other brake shoe adjacent to and engageable by said actuating lever, and an operating device having relatively movable parts separately and respectively connected to said lever arm and actuating lever, so that actuation of said operating device to pivot said actuating lever in one direction causes said actuating lever to engage said abutment and produce relative pivoting movement between said actuating lever and said lever arm and said outward pivotal movement of said lever arm about said pivotal connection with said strut.

14. A brake as claimed in claim 13 wherein said strut is adjustable in length and further comprising:

a ratchet device on said strut;

a pawl pivotally mounted on said strut and co-operatively engaging said ratchet device; and spring means between said pawl and said lever arm for resiliently urging said pawl into engagement with a surface on said lever arm to sense the degree of adjustment of said strut length for automatically adjusting said strut length by said pawl and ratchet device.

15. A brake as claimed in claim 14 wherein:

said force transmission means comprises a roller.

16. A brake as claimed in claim 1 wherein:

said force transmission means comprises a roller.

17. A brake as claimed in claim 16 wherein:

said brake shoes each have a web portion; and said lever arm comprises a pair of spaced parallel plate member disposed respectively on opposite sides of said web portion of said one brake shoe.

18. A brake shoe as claimed in claim 18 wherein:
said roller is rotatably mounted between said plate members.
19. A brake as claimed in claim 1 wherein:
said brake shoes each have a web portion; and
said lever arm comprises a pair of spaced parallel plate members disposed respectively on opposite sides of said web portion of said one brake shoe.

* * * * *